(12) United States Patent
Weast et al.

(10) Patent No.: US 12,393,726 B2
(45) Date of Patent: Aug. 19, 2025

(54) TECHNOLOGIES FOR PRESENTING PUBLIC AND PRIVATE IMAGES

(71) Applicant: Intel Corporation, Santa Clara, CA (US)

(72) Inventors: John C. Weast, Portland, OR (US); Joshua Boelter, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 18/463,870

(22) Filed: Sep. 8, 2023

(65) Prior Publication Data

US 2024/0070320 A1 Feb. 29, 2024

Related U.S. Application Data

(60) Continuation of application No. 18/062,219, filed on Dec. 6, 2022, now Pat. No. 11,853,458, which is a
(Continued)

(51) Int. Cl.
G06F 21/62 (2013.01)
G06F 3/14 (2006.01)
(Continued)

(52) U.S. Cl.
CPC ............ *G06F 21/6245* (2013.01); *G06F 3/14* (2013.01); *G06F 21/35* (2013.01); *G06F 21/84* (2013.01);
(Continued)

(58) Field of Classification Search
CPC ...... G06F 21/35; G06F 21/6245; G06F 21/84; G06F 3/14; G09G 2354/00; G09G 2356/00; G09G 2358/00; G09G 3/001
See application file for complete search history.

(56) References Cited

U.S. PATENT DOCUMENTS 8,692,930 B2   4/2014  Rolston
2002/0101988 A1  8/2002  Jones
(Continued)

FOREIGN PATENT DOCUMENTS

CN    103365657 A   10/2013
CN    103425119 A   12/2013
(Continued)

OTHER PUBLICATIONS

Notification of Transmittal of the International Search Report and the Written Opinion of the International Searching Authority, or the Declaration for PCT Application No. PCT/US2015/057166, mailed Feb. 5, 2016, 14 pages.
(Continued)

*Primary Examiner* — Theodore C Parsons
(74) *Attorney, Agent, or Firm* — JAFFERY WATSON HAMILTON & DESANCTIS LLP

(57) ABSTRACT

Technologies for displaying public and private images includes a display device and one or more user viewing devices. The display device is configured to display or generate a personalized image or video that is viewable by an authorized user viewing device and not viewable by unauthorized viewing devices. To facilitate the display of the personalized images, the display device and the user viewing device(s) may negotiate a display protocol to be used by the display device to display the personalized image in a private manner. In some embodiment, the display device may also display a public image or video that is viewable by unauthorized viewing devices and/or individuals without viewing devices.

18 Claims, 6 Drawing Sheets

Related U.S. Application Data continuation of application No. 16/412,845, filed on May 15, 2019, now abandoned, which is a division of application No. 14/551,911, filed on Nov. 24, 2014, now Pat. No. 10,380,375.

(51) Int. Cl.
*G06F 21/35* (2013.01)
*G06F 21/84* (2013.01)
*G09G 3/00* (2006.01)

(52) U.S. Cl.
CPC ......... *G09G 3/001* (2013.01); *G09G 2354/00* (2013.01); *G09G 2356/00* (2013.01); *G09G 2358/00* (2013.01)

(56) References Cited

U.S. PATENT DOCUMENTS

| | | |
|---|---|---|
| 2008/0004950 A1 | 1/2008 | Huang |
| 2009/0059103 A1 | 3/2009 | Azor et al. |
| 2009/0061901 A1 | 3/2009 | Arrasvuori |
| 2011/0191432 A1 | 8/2011 | Layson |
| 2012/0054001 A1 | 3/2012 | Zivkovic |
| 2012/0179527 A1 | 7/2012 | Ball |
| 2012/0194420 A1* | 8/2012 | Osterhout ............ G06F 3/013 345/156 |
| 2013/0038702 A1 | 2/2013 | Schweitzer |
| 2013/0103943 A1 | 4/2013 | Hirsch |
| 2013/0143651 A1 | 6/2013 | Harrison et al. |
| 2013/0254039 A1 | 9/2013 | Kim |
| 2013/0307870 A1 | 11/2013 | Ashbrook |
| 2014/0103104 A1 | 4/2014 | Jover |
| 2014/0188616 A1 | 7/2014 | Badenhop |
| 2015/0026708 A1 | 1/2015 | Ahmed |
| 2016/0042602 A1 | 2/2016 | Phan |
| 2016/0171220 A1 | 6/2016 | Yu |
| 2018/0232769 A1 | 8/2018 | Barak |
| 2019/0295551 A1 | 9/2019 | White |

FOREIGN PATENT DOCUMENTS

| | | |
|---|---|---|
| CN | 107077312 A | 8/2017 |
| EP | 3224795 A | 10/2017 |
| WO | 2016/085601 A1 | 6/2016 |

OTHER PUBLICATIONS

First Office Action for Chinese Application No. 201580056371.4, dated May 23, 2019, 2 pages.
Extended European Search Report for EP Application No. 15862598.8, mailed 08.05.2018, 9 pages.
Apr. 21, 2017, FESPA, "Turning the whole world into an interactive billboard with AR", https://www.fespa/com/en/news-media/features/turning-the-whole-world-into-an-interactive-billboard-with-ar.
Noyola et a;., Spring 2015, Stanford University, https://web.stanford.edu/class/cs231m/projects/final-report-noyola-stanko.pdf.
Third Office Action for Chinese Application No. 201580056371.4. dated Jun. 1, 2020, including machine translation (27 pages).
European Office Action for European Application No. 15862598.8, dated Sep. 4, 2020 (6 pages).
Second Office Action for Chinese Application No. 201580056371.4, dated Feb. 3, 2020, including machine translation (29 pages).
European Office Action for European Application No. 15862598.8, dated Sep. 26, 2019 (6 pages).

\* cited by examiner

TECHNOLOGIES FOR PRESENTING PUBLIC AND PRIVATE IMAGES

CROSS-REFERENCE TO RELATED APPLICATIONS

This application is a continuation of and claims the benefit of and priority to U.S. application Ser. No. 18/062,219, entitled TECHNOLOGIES FOR PRESENTING PUBLIC AND PRIVATE IMAGES, by John C. Weast, et al., filed Dec. 6, 2022, now allowed, which is a continuation of and claims the benefit of and priority to U.S. application Ser. No. 16/412,845, entitled TECHNOLOGIES FOR PRESENTING PUBLIC AND PRIVATE IMAGES, by John C. Weast, et al., filed May 15, 2019, now abandoned, which is a divisional (and claims the benefit of and priority under 35 U.S.C. § 120) of U.S. patent application Ser. No. 14/551,911 entitled TECHNOLOGIES FOR PRESENTING PUBLIC AND PRIVATE IMAGES, by John C. Weast, et al., filed Nov. 24, 2014, now issued as U.S. Pat. No. 10,380,375, the entire contents of which are incorporated herein by reference.

BACKGROUND

Display devices are used to display information and entertainment content to viewers in the vicinity of the display. Display devices may be public or private. Public displays, such as crowd displays at sporting events, advertisement displays, and other displays in public areas typically display images and information for consumption by the general public. Private displays, such as computer displays, personal televisions, personal mobile device displays, and other displays controlled by a private entity are generally used to display personal images or information intended for consumption by the user of such devices or a select group of authorized individuals.

Display devices, both public and private, are becoming ubiquitous in the everyday life of many people. Additionally, as display technology improves, displays are increasingly being integrated and/or embedded in other devices or articles. For example, display technology is currently being incorporated into transparent windows, clothing, personal accessory items, and other devices. Such proliferation of display devices creates difficulties in communicating targeted information to individuals while maintaining a degree of privacy over such information.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
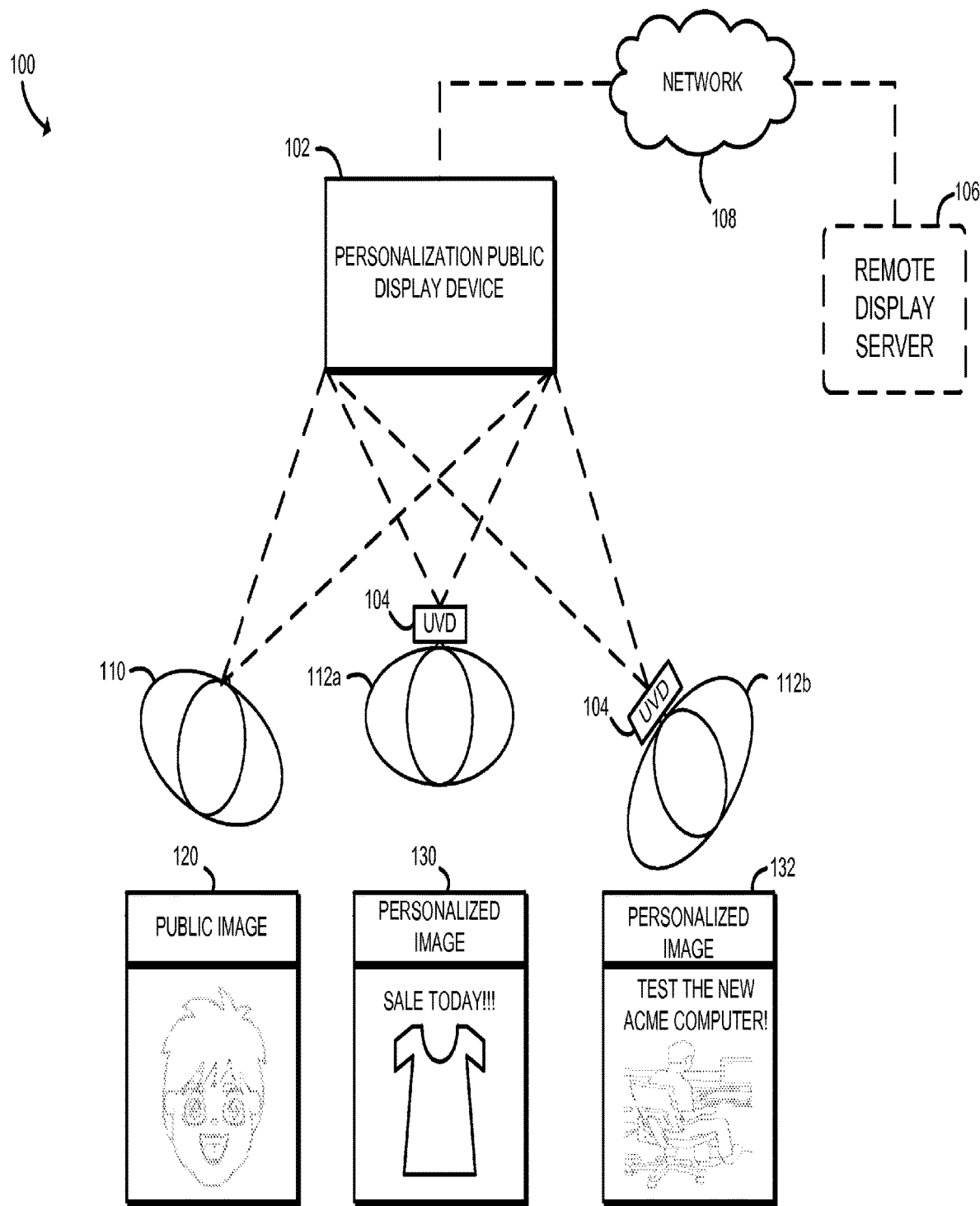
FIG. 1 is a simplified diagram of at least one embodiment of a system for displaying personalized image(s) to a viewer in a private manner.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for displaying personalized image(s) to a viewer includes a personalization public display device 102 and one or more user viewing devices 104, which may be worn or otherwise operated by a corresponding user 112. In use, as discussed in more detail below, the display device 102 is configured to display a personalized image or images (e.g., video) to a user, or group of users, of a particular user viewing device 104 (e.g., smart glasses, a smart phone, or other viewing device) in a private manner. In particular, the display device 102 displays or presents the personalized image(s) such that the personalized image(s) are viewable via use of an authorized user viewing device(s) 104 and not viewable by other unauthorized user viewing devices 104 and/or users without a user viewing devices 104. To do so, the display device 102 and the targeted user viewing device 104 communicate with each other to establish one or more display protocols, which are used by the personalization public display device 102 to display or otherwise present the personalized image(s) in the private manner. The personalized images may be displayed by the display device 102 itself (e.g., in an encrypted or obscured format) or provided to the authorized user viewing device 104 by the display device 102 or an associated cloud service. For example, in some embodiments, the display device 102 may display the personalized image on a local display using any suitable display protocol capable of obscuring or encrypting the personalized image on the local display such as, for example, a polarization display protocol, a color filtering display protocol, a view segmentation display protocol, a layered depth variation display protocol, a pixel obfuscation display protocol, a pixel encoding display protocol, or other display protocol that allows the display device 102 to display the personalized image in an obscured or encrypted manner, while also allowing the targeted user viewing device 104 to properly view the personalized image. Alternatively, in other embodiments, the display device 102 (or an associated cloud service) may transmit the personalized image(s) to the authorized user viewing device 104 for display or presentation on a local display, projection surface, or lens of the user viewing device 104. In such embodiments, the personalized images may be embodied as still image(s) or streamed images/video/audio (e.g., a video according to a Moving Picture Experts Group (MPEG) standard). In some embodiments, the display device 102 overlay the personalized images/video over a viewable area of the display or projection surface to provide an augmented reality view as discussed in more detail below.

To view the personalized image, the user viewing device 104 also utilizes the established display protocol by, for example, decrypting a received or viewable encrypted personalized image, operating a local display according to the display protocol, controlling visual characteristics of a viewer lens, or other viewing technique based on the established display protocol. In some embodiments, the display protocol used to display and view the personalized image may be modified over time based on, for example, the user's location relative to the display device 102, security timeouts, bandwidth or throughput considerations, and/or other criteria.

An example of the operation of the system 100 is depicted in FIG. 1. A user 110 is shown viewing a display of the personalization public display device 102. However, because the user 110 does not have a user viewing device 104, the user 110 sees a public image 120 that is displayed on the display by the display device 102. The public image 120 (e.g., a cartoon character) is viewable by the general public, e.g., by anyone viewing the display device 102 without an authorized user viewing device 104. Conversely, a user 112a is viewing the display of the display device 102 with an authorized user viewing device 104 that has established a display protocol with the display device 102. As such, the user 112a sees a personalized image 130, such as a targeted advertisement for a shirt. Depending on the display protocol used, the user 112a may view the personalized image by looking at a local display of the user's 112a viewing device 104 or by looking at the display of the display device 102. Similarly, another user 112b is viewing the display of the display device 102 with a different authorized user viewing device 104 that has established a different display protocol with the display device 102. As such, the user 112b sees a different personalized image 132, such as a targeted advertisement for a new computer. Again, the user 112b may view the personalized image by looking at a local display of the user's 112b viewing device 104 or by looking at the display of the display device 102 depending on the particular display protocol used. In this way, the display protocols used by the personalization public display device 102 and the authorized user viewing device(s) 104 may be used to establish a private viewing modality between the two devices 102, 104. Of course, a group of users may be authorized to view the same personalized image by implementing the same display protocol in some embodiments.

Figure 2:
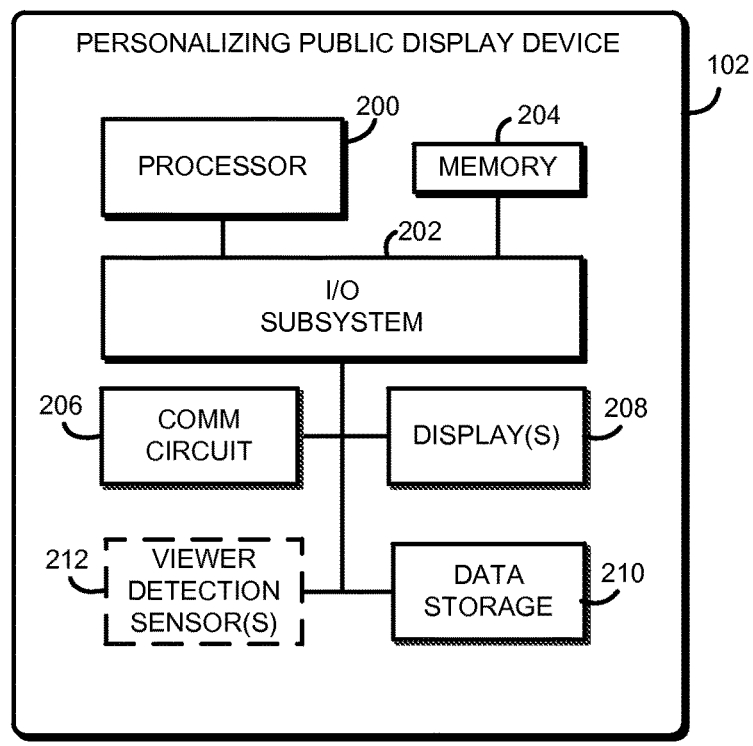
FIG. 2 is a simplified block diagram of at least one embodiment of a personalization public display device of the system of FIG. 1.

Referring now to FIG. 2, the personalization public display device 102 may be embodied as any type of display device capable of displaying, streaming, or otherwise presenting images, video and/or audio to a viewer and performing the functions described herein. For example, the display device 102 may be embodied as a crowd display, an advertisement display, an information display, a television, a smart appliance, a computer device, or other device or display surface having display capabilities. In some embodiments, the personalization public display device 102 may be incorporated into other devices or articles such as "smart" clothing, appliances, or other devices or objects.

In the illustrative embodiment, the display device 102 includes a processor 200, an input/output subsystem 202, a memory 204, one or more displays 208, a communication circuit 206, and a data storage 210. Of course, the display device 102 may include other or additional components, such as those commonly found in a display device or other computing device (e.g., various input/output devices), in other embodiments. Additionally, in some embodiments, one or more of the illustrative components may be incorporated in, or otherwise form a portion of, another component. For example, the memory 204, or portions thereof, may be incorporated in the processor 200 in some embodiments.

The processor 200 may be embodied as any type of processor capable of performing the functions described herein. For example, the processor 200 may be embodied as a single or multi-core processor(s), digital signal processor, microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the display device 102 such as operating systems, applications, programs, libraries, and drivers. The memory 204 is communicatively coupled to the processor 200 via the I/O subsystem 202, which may be embodied as circuitry and/or components to facilitate input/output operations with the processor 200, the memory 204, and other components of the display device 102. For example, the I/O subsystem 202 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 202 may form a portion of a system-on-a-chip (SoC) and be incorporated, along with the processor 200, the memory 204, and other components of the display device 102, on a single integrated circuit chip.

The communication circuit 206 of the display device 102 may be embodied as any communication circuit, device, or collection thereof, capable of enabling communications between the display device 102 and the user viewing devices 104 as discussed in more detail blow. The communication circuit 206 may be configured to use any one or more communication technology and associated protocols (e.g., Ethernet, Bluetooth®, Wi-Fi®, WiMAX, etc.) to effect such communication.

The display 208 may be embodied a display local to the display device 102 or remote therefrom, but communicatively to thereto. For example, in some embodiments, the display 208 may be located at one location, while the remaining components of the display device 102 are located at another location remote from the display 208 but communicatively coupled thereto (e.g., via an interconnection, network, etc.) Although shown in FIG. 1 as a single display, it should be appreciated that the display 208 may embodied as multiple, individual displays in other embodiments. For example, the display 208 may be embodied as an arrangement of displays located in, for example, a shopping mall or similar retail location. Alternatively, the display 208 may be embodied as a single display in some implementations. The individual display(s) 208 may be embodied as any type of display capable of displaying digital information such as a liquid crystal display (LCD), a light emitting diode (LED), a plasma display, a cathode ray tube (CRT), or other type of display device. Additionally, the display(s) 128 may be of any size or shape and have any suitable resolution, color, and/or have any other feature or quality commonly found in a display. In some embodiments, the display 208 may be attached to, embedded in, or otherwise incorporated into other devices or structures in some embodiments. For example, the display 208 may be incorporated in a transparent window, in clothing, in a smart device, or other device or article in which the display 128 is generally viewable by a public population.

The data storage 210 may be embodied as any type of device or devices configured for short-term or long-term storage of data such as, for example, memory devices and circuits, memory cards, hard disk drives, solid-state drives, or other data storage devices. In some embodiments, the display device 102 may also store the personalized images displayed on the display 208 and/or transmitted to the user viewing device 104. Additionally, the display device 102 may store the various display protocols and viewer policies in the data storage 210 which are used to select and display the personalized images as discussed in more detail below.

In some embodiments, the display device 102 may also include one or more viewer detection sensors 212. The viewer detection sensors 212 may be embodied as any type of sensor and/or circuit capable of sensing, detecting, or otherwise generating sensor data indicative of the presence of a user viewing device 104 within the proximity or vicinity of the display device 102. For example, the viewer detection sensor 212 may be embodied as a communication circuit (e.g., the communication circuit 206 or portion thereof) configured to sense or detect communications from a user viewing device 104, proximity sensors and associated circuitry configured to detect the presence of a user viewing device 104, camera or image sensors and associated circuitry to detect the presence of a user viewing device 104 based on capture images, or other sensor or sensor circuitry capable of detecting the presence of a user viewing device 104 in proximity to the display device. As discussed in more detail below, upon detecting the presence of a user viewing device 104 within the vicinity, the display device 102 may initiate a negotiating procedure to establish the display protocols used to display the personalized image to a user of the authorized user viewing device 104.

In some embodiments, the display device 102 may further include one or more peripheral devices. Such peripheral devices may include any type of peripheral device commonly found in a display device or other computer device such as, for example, a hardware keyboard, input/output devices, peripheral communication devices, and/or other peripheral devices.

Figure 3:
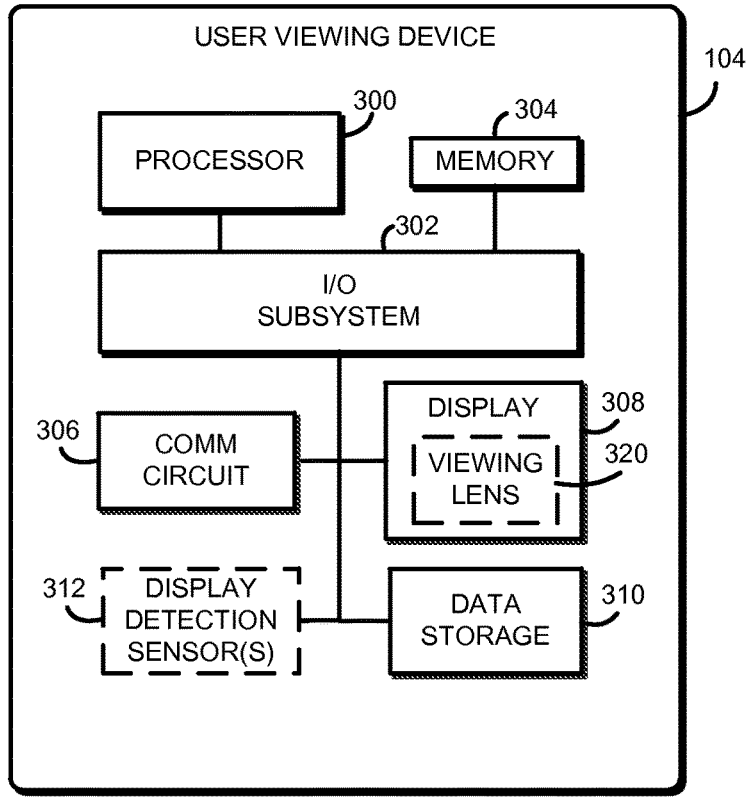
FIG. 3 is a simplified block diagram of at least one embodiment of a user viewing device of the system of FIG. 1.

Referring now to FIG. 3, the user viewing device 104 may be embodied as any type of device capable of viewing a personalized image displayed or transmitted by the personalization public display device 102 (or an associated cloud service). For example, the user viewing device 104 may be embodied as a pair of smart glasses, electronic corneal implants, a smart phone or tablet, or other viewing device. Depending on the type of display device 102 and/or implementation of the system 100, the user viewing device 104 may be configured to view the personalized images by providing real-world augmentation, visual filtering, and/or displaying of the personalized images locally. For example, the user viewing device 104 may be embodied as a pair of smart glasses configured to project or overlay an image of the personalized images onto a viewing lens of the glasses or configured to control a visual filter or shutter embedded in the viewing lens of the glasses. As an alternative example, the user viewing device 104 may be embodied as smart phone, camera, or other device having a local display onto which the personalized image may be displayed (e.g., overlaid onto a real-time image of the real-world to provide an augmented reality). As such, the user viewing device 104 may be embodied as any type of device usable by a user to view the personalized images.

In the illustrative embodiment, the user viewing device 104 includes a processor 300, an input/output subsystem 302, a memory 304, a display 308, a communication circuit 306, and a data storage 310. Of course, the user viewing device 104 may include other or additional components, such as those commonly found in a viewing device or other computing device (e.g., various input/output devices), in other embodiments. Additionally, in some embodiments, one or more of the illustrative components may be incorporated in, or otherwise form a portion of, another component. For example, the memory 304, or portions thereof, may be incorporated in the processor 300 in some embodiments.

Similar to the processor 200 of the display device 102, the processor 300 may be embodied as any type of processor capable of performing the functions described herein. For example, the processor 300 may be embodied as a single or multi-core processor(s), digital signal processor, microcontroller, or other processor or processing/controlling circuit. Similarly, the memory 304 may be embodied as any type of volatile or non-volatile memory or data storage capable of performing the functions described herein. In operation, the memory 304 may store various data and software used during operation of the display device 102 such as operating systems, applications, programs, libraries, and drivers. The memory 304 is communicatively coupled to the processor 300 via the I/O subsystem 302, which may be embodied as circuitry and/or components to facilitate input/output operations with the processor 300, the memory 304, and other components of the user viewing device 104. For example, the I/O subsystem 302 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 302 may form a portion of a system-on-a-chip (SoC) and be incorporated, along with the processor 300, the memory 304, and other components of the user viewing device 104, on a single integrated circuit chip.

The communication circuit 306 of the user viewing device 104 may be embodied as any communication circuit, device, or collection thereof, capable of enabling communications between the user viewing device 104 and the display device 102. The communication circuit 306 may be configured to use any one or more communication technology and associated protocols (e.g., Ethernet, Bluetooth®, Wi-Fi®, WiMAX, etc.) to effect such communication.

The display 308 may be embodied as any type of display on which a personalized image may be projected or displayed. For example, the display 308 may be embodied as a liquid crystal display (LCD), a light emitting diode (LED), a plasma display, a cathode ray tube (CRT), or other type of display device. Additionally or alternatively, the display 308 may be embodied as, or otherwise include, a viewing lens 320 (e.g., the transparent viewing glass of a pair of smart glasses, a retinal implant, etc.). In such embodiments, the user viewing device 104 may be configured to project the personalized image onto the viewing lens 320 in an augmented reality manner as discussed above. Alternatively, in some embodiments, the user viewing device 104 may be configured to control the viewing lens 320 to adjust visual filtering, shuttering, or other visual quality or characteristic of the viewing lens 320. For example, the viewing lens 320 may include an adjustment mechanism (e.g., shutter, iris, segmented view adjustment, etc.) operable to control a visual characteristic of the viewing lens. In such embodiments, the display protocol may be embodied as a control protocol for the adjustment mechanism.

The data storage 310 may be embodied as any type of device or devices configured for short-term or long-term storage of data such as, for example, memory devices and circuits, memory cards, hard disk drives, solid-state drives, or other data storage devices. In some embodiments, the user viewing device 104 may store a local viewer policy in the data storage 310, which is transmitted to the display device 102 to facilitate the selection of a personalized image.

In some embodiments, the user viewing device 104 may also include one or more display detection sensors 312. Similar to the viewer detection sensor(s) 212, the display detection sensors 312 may be embodied as any type of sensor capable of sensing, detecting, or otherwise generating sensor data indicative of the presence of a personalization public display device 102 within the proximity or vicinity of the user viewing device 104. For example, the display detection sensor 312 may be embodied as a communication circuit (e.g., the communication circuit 306 or portion thereof) configured to sense or detect communications from the display device, respond to such communications, and/or transmit an announcement of the presence of the user viewing device 104. Alternatively or additionally, the display detection sensors 312 may be embodied as or otherwise include sensors capable of detecting that the user is presently viewing the local display 308. For example, the user viewing device 104 may infer the presence of a display device 102 based on the user's interactions with the display 308 and/or other components of the user viewing device 104.

The user viewing device 104 may also further include one or more peripheral devices in some embodiments. Such peripheral devices may include any type of peripheral device commonly found in a viewing device or other computer device such as, for example, a hardware keyboard, input/output devices, peripheral communication devices, and/or other peripheral devices.

Referring back to FIG. 1, in some embodiments, the system 100 may also include a remote display server 106, which is accessible by the display device 102 over a network 108. In such embodiments, the personalization public display device 102 may be embodied as a "low featured" display operated by the remote display server 106 over the network 108. For example, the personalized images may be stored on the remote display server 106, and the server 106 may select which personalized images to display as discussed in more detail below. In such embodiments, the network 108 may be embodied as any type of communication network capable of facilitating communication between the display device 102 and the remote display server 106. As such, the network 108 may include one or more networks, routers, switches, computers, and/or other intervening devices. For example, the network 108 may be embodied as or otherwise include one or more local or wide area networks, cellular networks, publicly available global networks (e.g., the Internet), an ad hoc network, a short-range communication network or link, or any combination thereof.

Figure 4:
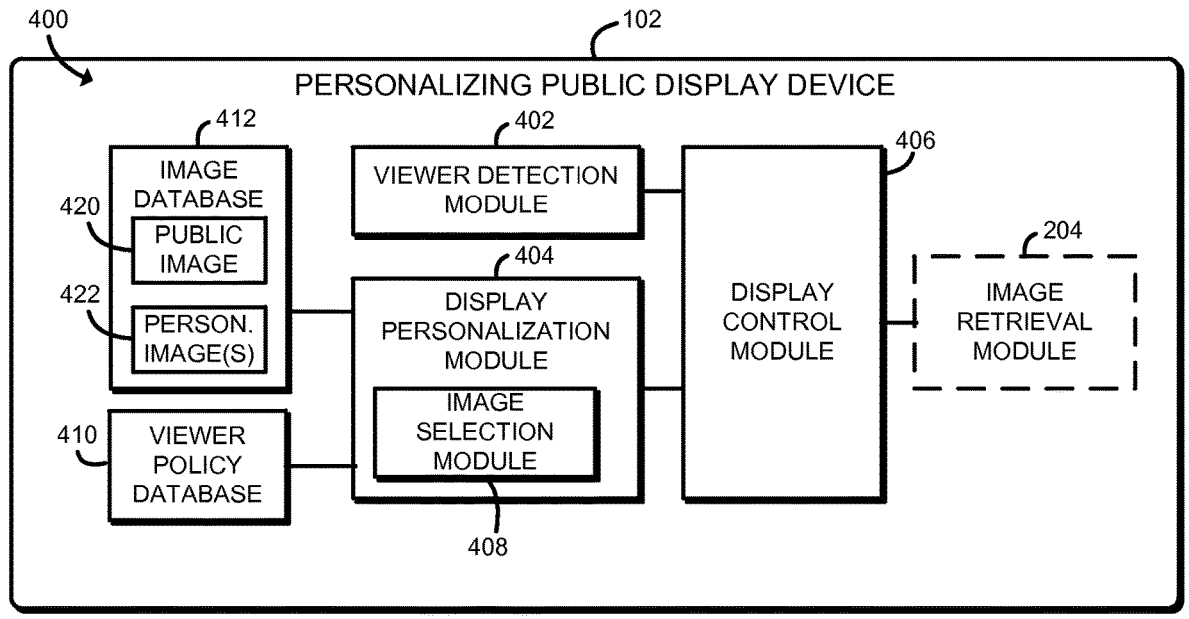
FIG. 4 is a simplified block diagram of at least one embodiment of an environment of the personalization public display device of FIG. 2.

Referring now to FIG. 4, in use, the personalization public display device 102 establishes an environment 400. The illustrative environment 400 includes a viewer detection module 402, a display personalization module 404, and a display control module 406. The various modules of the environment 400 may be embodied as hardware, firmware, software, or a combination thereof. For example, the various modules, logic, and other components of the environment 400 may form a portion of, or otherwise be established by, the processor 200 or other hardware components of the display device 102.

The viewer detection module 402 is configured to detect the presence of a user viewing device 104 within proximity to the display device 102. To do so, the viewer detection module 402 may analyze the sensor data generated by the viewer detection sensors 212. For example, in some embodiments, the viewer detection module 402 may monitor a local network for communications from a user viewing device 104. Additionally or alternatively, the viewer detection module 402 may transmit or broadcast a discovery request to prompt a response from nearby user viewing device 104. Further, in some embodiments, the viewer detection module 402 may analyze image or other data generated by the viewer detection sensors 212 to determine the presence of a user viewing device 104. For example, the viewer detection module 402 may analyze images of the local vicinity to identify individuals in the images (e.g., via facial recognition, video analytics, etc.) and determine whether the individuals are carrying or using user viewing devices 104. The viewer detection module 402 may pair the identified individuals with the detected user viewing devices 104. As such, it should be appreciated that the viewer detection module 402 may utilize any suitable methodology and/or technology to detect and establish communication's with a user viewing device 104.

The display personalization module 404 is configured to negotiate with the target user viewing device 104 to establish the display protocol(s) to be used to display the personalized image. To do so, the display personalization module 404 utilize a viewer policy database 410, which may include data or policies dictating or identifying criteria on which the display protocol(s) may be selected. For example, the viewer policy database 410 may include data that identifies which display protocol(s) a particular user viewing device 104 is capable of implementing (e.g., whether the user viewing device 104 is capable of visual filtering). Additionally or alternatively, the viewer policy database 410 may include data indicative of a display protocol preference of a user of a particular user viewing device 104. The viewer policy database 410 may be updated over time based on, for example, historical interactions with the authorized user viewing device 104. Additionally or alternatively, the user viewing device 104 may provide or update the viewer policy to the display device 102 as discussed in more detail below.

The display personalization module 404 also manages the selection of images, videos, and/or other digital content (e.g., applications or other interactive experiences) to be displayed or otherwise presented by the display device 102. To do so, the display personalization module 404 includes an image selection module 408 configured to determine or select public and/or personalized image(s), video, and/or other media to be presented by the display device 102. For example, the image selection module 408 may select or determine one or more public images 420 to be displayed or presented by the display device 102. As discussed above, the public images 420 are viewable by the general public (e.g., individuals without a user viewing device 104 and/or unauthorized user viewing devices 104). Additionally, the image selection module 408 may select a personalized image 422 for display or presentation to a user of an authorized user viewing device 104 using the established display protocol.

Depending on the particular implementation, the image selection module 408 may utilize any suitable criteria or data to select the personalized image 422. For example, the image selection module 408 may select a personalized image 422 based on criteria related to the personalized image 422 itself and/or based on criteria related to a user of the targeted user viewing device 104. In one illustrative example, the image selection module 408 may select a personalized image 422 based on a current advertisement campaign, the time of day, local environment conditions, in response to detected or identified events, and/or other criteria that is not directly related to the user of the user viewing device 104. Additionally or alternatively, the image selection module 408 may select the personalized image 422 based on aspects or characteristics of the user of the user viewing device 104 such as, for example, physical characteristics of the user, past purchasing behavior, personal preferences, and/or the like. Such user preferences or characteristics may be included in the viewer policy database 410, which may be used by the image selection module 408 to select the personalized image 422. As discussed above, the user viewing device 104 may transmit or otherwise provide the viewer policies on which the personalized image selection is based to facilitate some control or filtering by the user over the selection process (e.g., the type of advertisements, brands, or content the user is interested in).

The personalized images 422 may be embodied as pre-generated images, video with or without associated audio, or other content, which are selected by the image selection module 408 based on a viewer policy or other data. Alternatively, in some embodiments, the personalized images 422 may be generated in real-time or near real-time based on the viewer policy or other data. Although shown in FIG. 4 as being stored on the personalization public display device 102, the public images 420 and the personalized images 422 may be stored on the remote display server 106 in some embodiments. As such, the display device 102 may retrieve the public images 420 and/or personalized images 422 as needed. In such embodiments, the environment 400 may include an image retrieval module 430 to retrieve the public images 420 and/or personalized images 422 from the remote display server 106.

The display control module 406 is configured to control the display(s) 208 to present the selected personalized image(s) 422, as well as any public image 420. As discussed in more detail below, the display control module 406 may display or otherwise present the selected personalized image 422 based on the established display protocol. For example, the display control module 406 may control the display 208 to display or present a personalized image in an encrypted or obscured manner, which may be subsequently decrypted or unobscured by the user viewing device 104. Depending on the established display protocol, the display control module 406 may be configured to control aspects of the display itself to display the personalized image 422 in an encrypted or obscured manner. For example, the display control module 406 may be configured to control a visual filter, shuttering, colorization, pixelization, of other aspect of the display 208 to display the personalized image 422.

Figure 5:
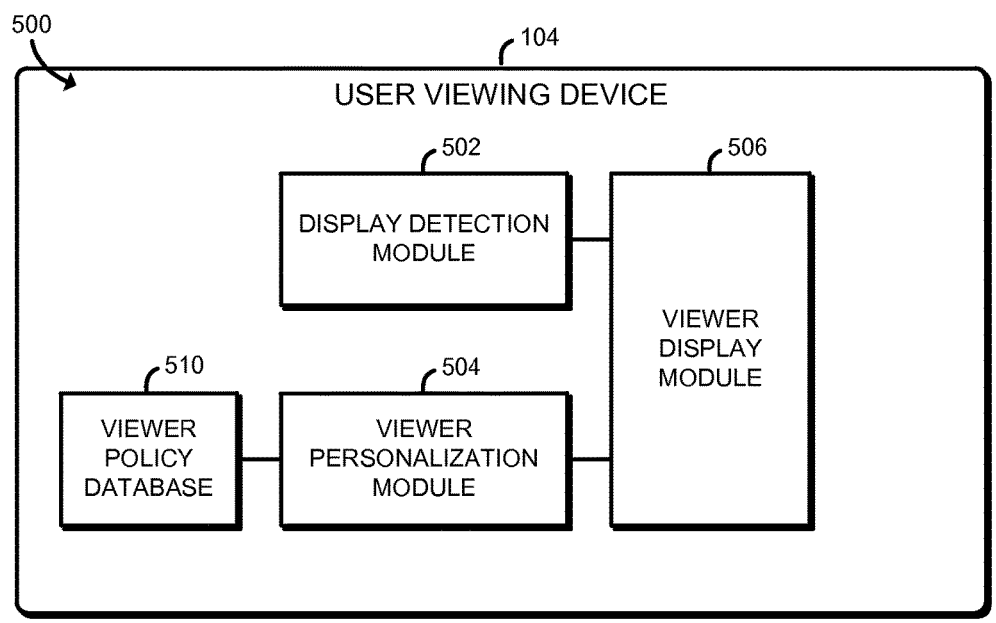
FIG. 5 is a simplified block diagram of at least one embodiment of an environment of the user viewing device of FIG. 3.

Referring now to FIG. 5, in use, the user viewing device 104 establishes an environment 500. The illustrative environment 500 includes a display detection module 502, a viewer personalization module 504, and a viewer display module 506. The various modules of the environment 500 may be embodied as hardware, firmware, software, or a combination thereof. For example, the various modules, logic, and other components of the environment 500 may form a portion of, or otherwise be established by, the processor 300 or other hardware components of the user viewing device 104.

The display detection module 502 is configured to detect the presence of a display device 102 in the local vicinity. To do so, in some embodiments, the viewer detection module 402 may be configured to communicate with the display device 102 to announce the presence of the user viewing device 104. For example, the display detection module 502 may respond to discovery requests or similar communications received from the display device 102 and/or initiate communications with the display device 102 to indicate that the user viewing device 104 is nearby.

The viewer personalization module 504 is configured to negotiate with the display device 102 to establish the display protocol(s). Similar to the display personalization module 404, the viewer personalization module 504 may utilize a local viewer policy database 510 to establish the display protocols. The viewer policy database 510 may include, for example, polices or other data that indicate which display protocols the user viewing device 104 is capable of implementing. As such, the viewer personalization module 504 may transmit such data to the display device 102 during the display protocol negotiations.

The viewer policy database 510 may also include policies or other data useable to identify or select a personalized image 422 for presentation to a user of the user viewing device 104. For example, the viewer policy database 510 may include policies or data that identify personal preferences or characteristics of the user of the user viewing device 104 such as, for example, physical characteristics of the user, past purchasing behavior, likes, dislikes, and/or the like. Again, the viewer personalization module 502 may transmit such data to the display device 102 for use in selecting the personalized image(s) 422.

The viewer display module 506 is configured to control the local display 308 and/or viewing lens 320 to allow viewing of the personalized image(s) presented by the display device 102. Depending on the particular display protocol used, the viewer display module 506 may locally display the personalized image 422 or control the viewing lens 320 to allow viewing of the personalized image 422 displayed by the display device 102. For example, in some embodiments, the viewer display module 506 may be configured to decrypt or unobscured a personalized image 422 displayed, presented, or transmitted by the display device 102 and locally display or project the decrypted/unobscured personalized image 422 on the local display 308. In doing so, the viewer display module 506 may locally display the personalized image 422 in an augmented reality manner (e.g., overlaid on the display 208 of the display device 102). Additionally or alternatively, the viewer display module 506 may control aspects of the viewing lens 320 to allow viewing of the personalized image 422 on the display 208 of the display device 102. For example, the viewer display module 506 may control an adjustment mechanism of the viewing lens 320 to control visual filtering, shuttering, or other visual quality of the viewing lens 320 to facilitate the viewing of the personalized image 422.

Figure 6:
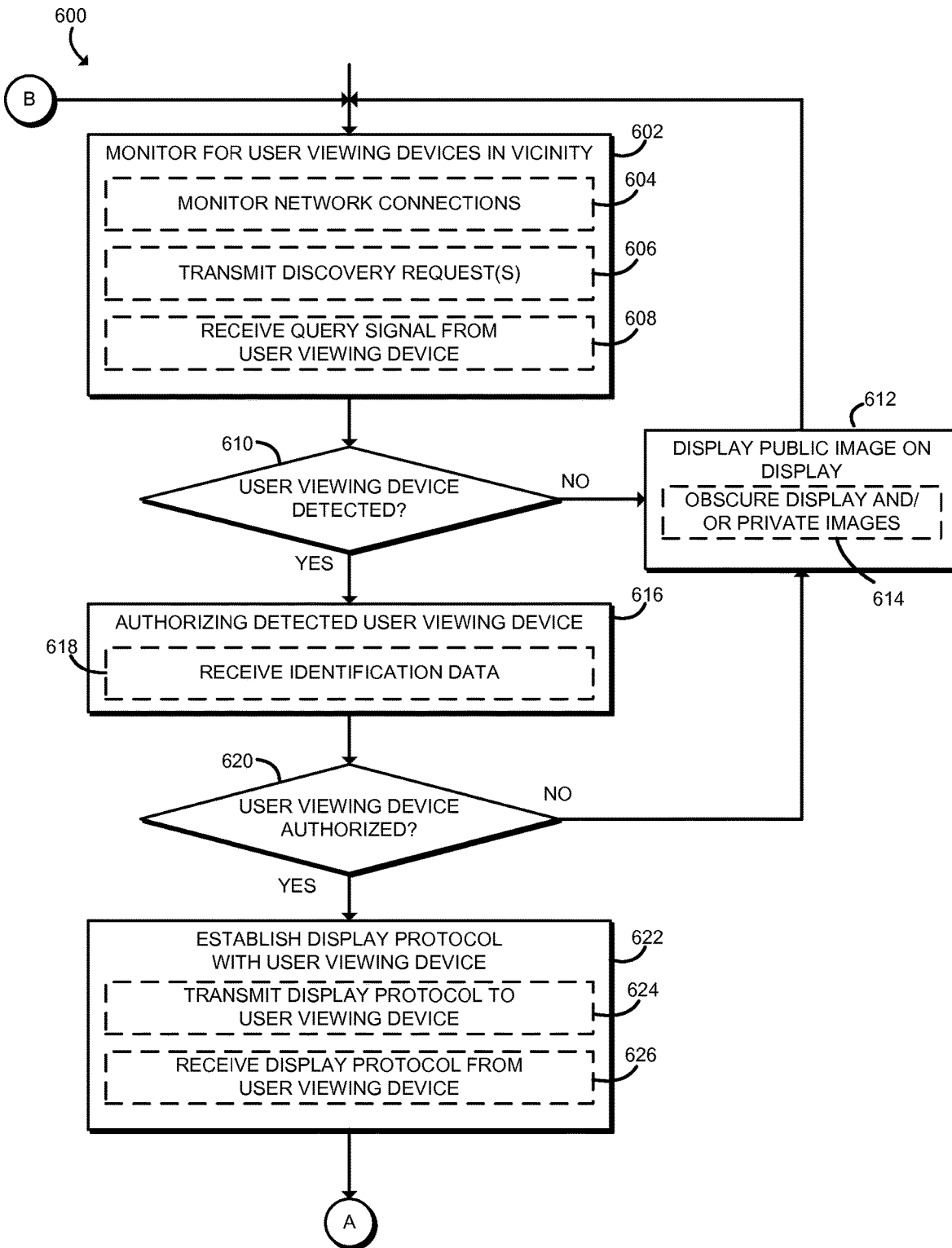
FIGS. 6 and 7 are a simplified flow diagram of at least one embodiment of a method for displaying personalized images to a viewer in a private manner that may be executed by the personalizing public display of FIGS. 2 and 4.
Figure 7:
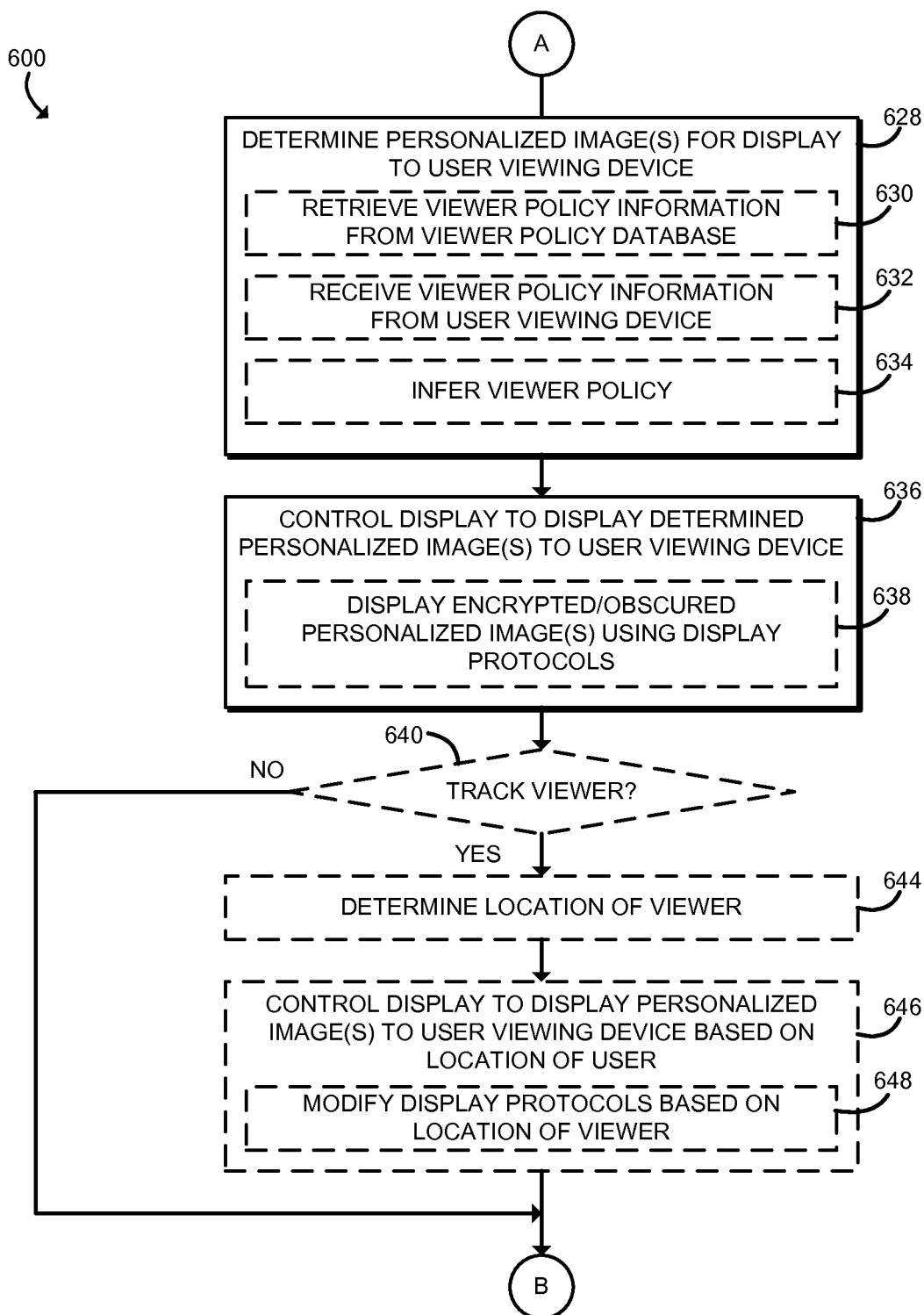

Referring now to FIGS. 6 and 7, in use, the personalization public display device 102 may execute a method 600 for personalizing display of images to a viewer. The method 600 beings with block 602 in which the display device 102 monitors for user viewing devices 104, and/or users of user viewing devices 104, in proximity to the display device 102. As discussed above, the display device 102 may use any suitable technology or methodology to discover local user viewing devices 104. For example, in block 604, the display device 102 may monitor communication traffic of a local network (e.g., a local ad hoc network) for announcements or other communications from a new user viewing device 104. Additionally or alternatively, in block 606, the display device 102 may transmit discovery requests and monitor responses to such signals. For example, in some embodiments, the display device 102 may periodically broadcast a discovery request to detect new user viewing devices 104 within the vicinity. Further, in some embodiment, the display device 102 may receive queries from a user viewing device 104 in block 608. In such embodiments, the user viewing device 104 may be configured to periodically broadcast queries searching for local display devices 102 as discussed below.

In block 610, the display device 102 determines whether a new user viewing device 104 has been detected in local proximity to the display device 102. It should be appreciated that the range of detection (i.e., the proximity threshold) used by the display device 102 to determine the presence, or lack thereof, of a user viewing device 104 may vary depending on the implementation and/or the methodology used to detect the user viewing device 104. For example, in some embodiments, a user may pre-register with an advertisement service or other display service to receive the personalized images from a network of displays 102. In such embodiments, the location of the user relative to a nearby display 102 may be tracked based on the location of the user viewing device 104 or other mobile device (e.g., via global positioning system (GPS) tracking). Of course, other methods for determining the location of the user relative to a local display device 102 may be used in other embodiments.

If no user viewing device 104 is detected within the proximity threshold, the method 600 advances to block 612 in which the display device displays or presents a public image 420. As discussed above, the public image 420 may be embodied as a default image that is viewable by the general public. Alternatively, in some embodiments, the display device 102 may not display a public image 420 but rather obscure the display and/or any personalized images 422 displayed on the display in block 620, such that the personalized image(s) 422 is not viewable by an unauthorized user viewing device 104. Additionally or alternatively, the display device 102 may display or present a default personalized image in block 612. The default personalized image may be selected based on known or expected users or user viewing devices 104 known or expected to be within the vicinity (e.g., based on an instruction from an associated cloud display service or otherwise inferred to be near the display device 102, even though the user or user viewing device 104 was not successfully detected). Regardless, the method 600 subsequently loops back to block 602 in which the display device 102 continues to monitor for user viewing devices 104.

If, however, the display device 102 determines that a new user viewing device 104 is present, the method 600 advances to block 616. In block 616, the display device 102 authorizes the detected user viewing device 104 to view personalized images. To do so, the display device 102 may authorize the user viewing device 104 based on any suitable criteria. For example, in block 618, the display device 102 may receive identification data from the user viewing device 104. The identification data may be embodied as any type of data that provides an identification of the user viewing device 104 and/or the user 112 of the user viewing device 104. For example, the identification data may include a model number, serial number, globally unique identification (GUID) number, or other identity data associated with the user viewing device 104. Additionally or alternatively, the identification data may include data that identifies the user 112. In such embodiments, the identification data may form a portion of the viewer policy 410. Further, in some embodiments, the display device 102 may authorize the user viewing device 104 based on the display capabilities of the user viewing device 104. For example, the display device 102 may authorize the user viewing device 104 to view personalized images 422 based on which display protocols are useable by the user viewing device 104.

In block 620, the display device 102 determines whether the detected user viewing device 104 is authorized. If not, the method 600 advances to block 612 in which the display device 102 display the public image 420 (or default personalized image) as discussed above. The method 600 subsequently loops back to block 602 in which the display device 102 continues to monitor for user viewing devices 104.

If, however, the display device 102 determines that the detected user viewing device 104 is authorized to view a personalized image, the method 600 advances to block 622. In block 622, the display device 102 establishes one or more display protocols with the detected user viewing device 104. To do so, in some embodiments, the display device 102 may be configured to determine or select the display protocol based on the viewer policies stored in the database 410 and/or received from the user viewing device 104. In such embodiments, the display device 102 may transmit the selected display protocol(s) to the user viewing device 104 in block 624. Additionally or alternatively, the user viewing device 104 may select or request the display protocol and transmit the selected/requested display protocol, which is received by the display device in block 626. Of course, in some embodiments, the display device 102 and user viewing device 104 may participate in a more complex negotiation based on other criteria and using any suitable negotiation methodology to arrive at a suitable display protocol.

The method 600 subsequently advances to block 628 of FIG. 7 in which the display device 102 determines the personalized image(s) 422 to be displayed or presented to the authorized user viewing device 104. As discussed above, the display device 102 may utilize any suitable criteria or data to select the personalized image 422 for display or presentation. For example, in some embodiments, the display device 102 may select the personalized image 422 based on a viewer policy retrieved from the local viewer policy database 410 in block 630. Additionally or alternatively, the display device may select the personalized image 422 based on a viewer policy received from the user viewing device 104 in block 632. In some embodiments, the block 634, the display device 102 may infer a viewer policy on which to select the personalized image 422. For example, the display device 102 may select the personalized image 422 based on the current time of day, environmental conditions, current sales, advertisement restrictions or conditions, and/or other criteria or data.

After the display device 102 has determined or selected a personalized image(s) 422 for presentation to a user of the authorized user viewing device 104, the method 600 advances to block 636. In block 636, the display device 102 controls the display 208 to display or present the selected personalized image 422. A discussed above, the display device 102 displays or presents the personalized image 422 in a private manner using the negotiated display protocol such that the personalized image 422 is viewable by the authorized user viewing device 104 and not viewable by unauthorized user viewing devices 104 or other unauthorized viewers. For example, in block 638, the display device 102 may display an encrypted or obscured personalized image 422 using the negotiated display protocol. The encrypted/obscured personalized image 422 is not discernable or otherwise viewable by unauthorized user viewing devices 104. However, user viewing devices 104 employing the negotiated display protocol can decrypted (e.g., via corresponding decryption keys) or otherwise unobscured (e.g. via controlling operation of the viewing lens 320) the personalized image 422 to allow viewing of the personalized image 422 by the user(s) of the authorized user viewing device 104. In other embodiments, the display device 102 may transmit the personalized images(s) 422 directly to the user viewing device(s) 104 for presentation thereon. Further, in some embodiments, the display device 102 may be configured to update or periodically change the personalized image 422 displayed or presented to the authorized user viewing device 104. For example, the display device 102 may change the personalized image 422 in response to interaction from a user of the user viewing device 104 on the user viewing device 104 and/or on the display device 102 itself.

It should be appreciated that the display device 102 may utilize multiple, different display protocols contemporaneously with each other to provide different personalized images 422 to different authorized user viewing devices 104. In such embodiments, only those personalized images 422 displayed according to the determined display protocol would be viewable by the corresponding authorized user viewing device 104. That is, personalized images displayed or presented by the display device 102 using another display protocol would not be viewable by an authorized user viewing device 104 configured to use a different display protocol. In this way, the display device 102 may manage multiple personalized images 422 while maintaining privacy between the various personalized images 422.

In some embodiments, the method 600 may advance to block 640 after presentation of the personalized images 422. In block 640, the display device 102 determines whether to track the authorized user viewing device 104 (or user thereof). If not, the method 600 loops back to block 602 in which the display device 102 continues to monitor for additional user viewing devices 104. If, however, the display device 102 determines to track the authorized user viewing device 104, the method 600 advances to block 644.

In block 644, the display device 102 determines the location of the user viewing device 104 or user thereof. To do so, the display device 102 may utilize any suitable technology or methodology to track the user viewing device 104. For example, the display device 102 may track the user viewing device 104 using proximity sensors, global positioning system data, image devices, and/or other devices useful in monitoring the location of the user viewing device 104 relative to the display device 102. Subsequently, in block 646, the display device 102 controls the display 208 to display or present the personalized image 422 based on the relative location of the user viewing device 104. For example, in block 648, the display device 102 may modify or update the display protocol used to display or present the personalized image 422 based on the present location of the user viewing device 104 relative to the display device 102. In this way, the display device 102 may maintain a level of privacy of the personalized images 422 while the user of the authorized user viewing device 104 moves around. The modification of the display protocol may be particularly useful in those embodiments in which the display protocol adjusts the visual characteristics or properties of the display 208 itself, such as polarization, color filtering, and/or view segmentation.

Figure 8:
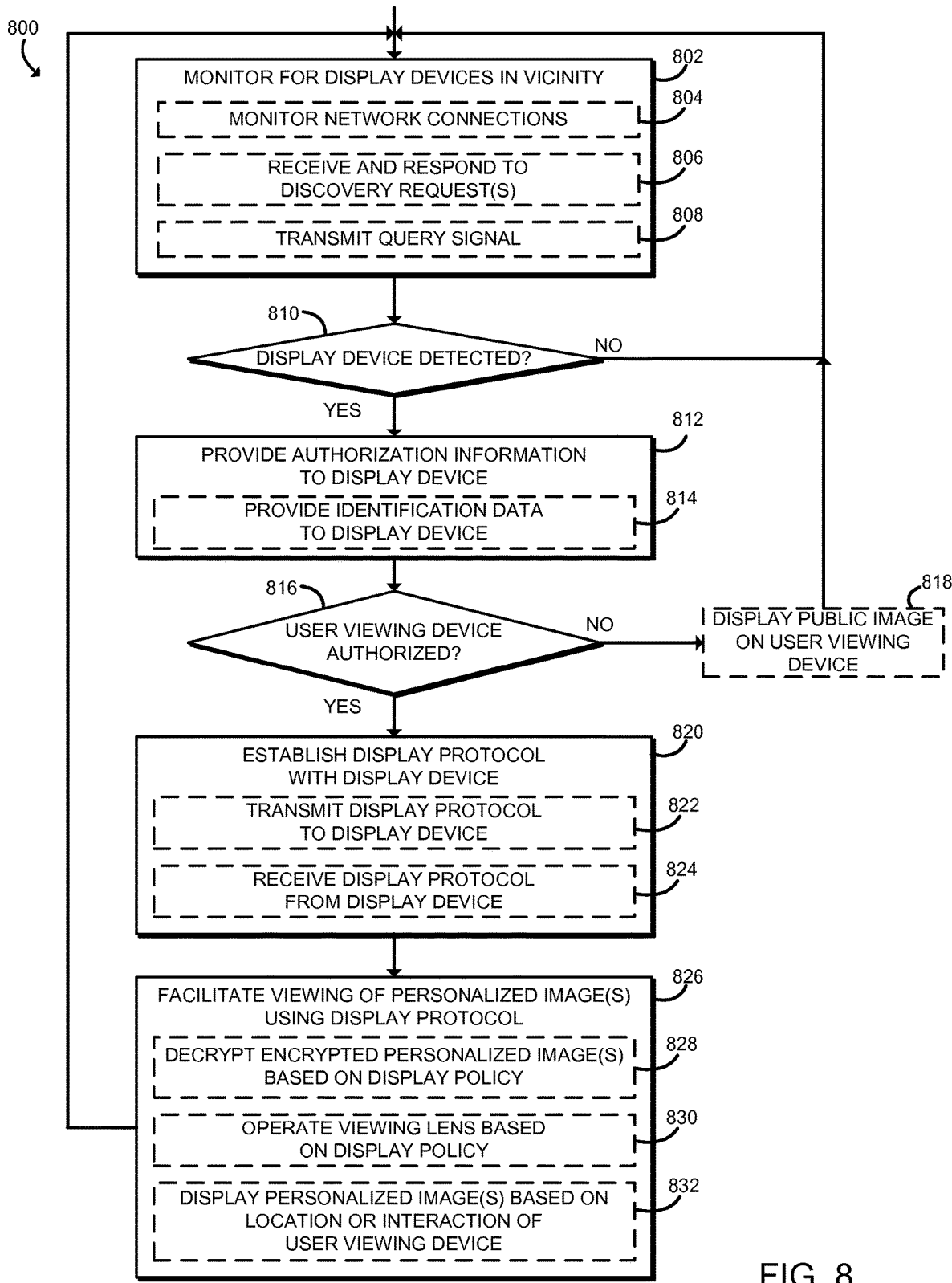
FIG. 8 is a simplified flow diagram of at least one embodiment of a method for viewing a personalized image that may be executed by the user viewing device of FIGS. 3 and 5.

Referring now to FIG. 8, in use, the user viewing devices 104 may execute a method 800 for viewing a personalized image. The method 800 begins with block 802 in which the user viewing device 104 monitors for display devices 102 in the local vicinity. Similar to the display device 102, the user viewing device 104 may use any suitable technology or methodology to discover a nearby display device 102. For example, in block 804, the user viewing device 104 may monitor communication traffic of a local network (e.g., a local ad hoc network) for announcements or other communications from a display device 102. Additionally or alternatively, in block 806, the user viewing device 104 may receive and respond to discovery request received from a local display device 102. Further, in some embodiments, the user viewing device 104 may periodically or responsively transmit queries to nearby display devices 102 in block 808.

In block 810, the user viewing device 104 determines whether a display device 102 has been detected nearby. If not, the method 800 loops back to block 802 in which the user viewing device 104 continues monitoring for a display device 102. If, however, a display device 102 has been detected in the local proximity, the method 800 advances to block 812 in which the user viewing device 104 attempts to authorize itself to the display device 102. To do so, the user viewing device 104 may utilize any authorization mechanism. For example, in some embodiments, the user viewing device 104 may transmit identification data to the display device 102 in block 814. As discussed above, the identification data may identify the user viewing device 104 (e.g., a serial number, GUID, or other identification data) and/or a user of the user viewing device 104 (e.g., a user number, account number, name, or other identification data).

In block 816, the user viewing device 104 determines whether the display device 102 has authorized it to view personalized image(s). If not, the method 800 advances to block 818 in some embodiments. In block 818, the user viewing device 104 may display or present a public image 420 transmitted or otherwise presented by the display device 102. For example, in some embodiments, the display device 102 may transmit a public image 420 for display (e.g., via an overlay in an augmented reality manner) to the user viewing device 104. In such embodiments, if the user viewing device 104 is not authorized, the user viewing device 104 may simply display the received public image on the local display 308. Regardless, the method 800 subsequently loops back to block 802 in which the user viewing device 104 continues monitoring for a display device 102.

If, however, the user viewing device 104 has been authorized, the method 800 advances to block 820. In block 820, the user viewing device 104 establishes the display protocol(s) with the display device 102. To do so, the user viewing device 104 may be configured to transmit a suggested, preferred, or required display protocol to the display device 102 in block 822. As discussed above, the display protocol may be embodied as a portion of the viewer protocol stored in the viewer policy database 510. Of course, rather than identifying a display protocol specifically, the user viewing device 104 may simply transmit data, on which the display device 102 may select or determine the display protocol. For example, as discussed above, the user viewing device 104 may transmit a viewer policy that includes data identifying the capabilities or features of the user viewing device 104. In block 824, the user viewing device 104 may receive the selected or identified display protocol from the display device 102. Of course, the display protocol may be embodied as features or functions inherent in the user viewing device 104 and, in such case, the user viewing device 104 may simply receive identification data in block 824 that identifies the selected display protocol. Further, in some embodiments, the user viewing device 104 and the display device 102 may not negotiate the display protocol. Rather, the display device 102 may display a personalized image 422 using a predetermined or default display protocol, and the user of the user viewing device 104 may decide whether to not to implement the display protocol on the user viewing device 104 to allow viewing of the personalized image 422. In this way, the user of the user viewing device 104 may filter which personalized images 422 are to be viewed (and the display device 102 may filter the type, content, brands, or other characteristic of the personalized images based on the display protocol used).

After the display protocol(s) has been established between the user viewing device 104 and the display device 102 in block 820, the method 800 advances to block 826 in which the user viewing device 104 facilitates the viewing of the personalized image 422 using the established display protocol. Depending on the particular display protocol used, the user viewing device 104 may display the personalized image 422 on the local display 308, project the personalized image 422 on the viewing lens 320, and/or control operation of visual features of the viewing lens 320 to allow viewing of the personalized image 422 displayed on the display 208 of the display device 102. As such, it should be appreciated that the viewable personalized image 422 may be displayed on either the display device 102 and/or the user viewing device 104 depending on the particular display protocols used. For example, in block 828, the display device 102 may display the personalized image 422 in an obscured manner on the display 208 suing a suitable display protocol (e.g., polarization, color filtering, or view segmentation), and the user viewing device 104 may control operation of the visual characteristics of the viewing lens 320 based on the established display protocol to enable a user of the user viewing device 104 to view the personalized image 422 on the display 208. Additionally or alternatively, in block 830, the display device may transmit an encrypted personalized image 422 to the user viewing device 104, which decrypts the encrypted personalized image 422 in block 830 and displays the decrypted personalized image 422 on the local display 308 or projects the decrypted personalized image 422 on the viewing lens 320 (e.g., in an augmented reality manner).

As discussed above, the display device 102 may be configured to adjust or update the display protocols based on the location of the user viewing device 104 relative to the display device 102. In such embodiments, the user viewing device 104 may display, project, or otherwise present the personalized image 422 to the user of the user viewing device 104 based on the present location of the user viewing device 104. That is, in such embodiments, the user viewing device 104 may be configured to update or adjust the display protocol consistent with the display device 102. Additionally, in some embodiments, the display device 102 and/or user viewing device 104 may update the display protocol and/or personalized image(s) based on the user's interaction with the user viewing device 104 and/or the display device 102. For example, the user of the user viewing device 104 may interact with the displayed or presented personalized image 422 on the user viewing device 104 or the display device 102 to cause the display device 102 to display or present other personalized images in response to the user's interaction (e.g., a subsequent advertisement based on the user's interaction with an initial advertisement or image). Subsequently, the method 800 loops back to block 802 in which the user viewing device 104 continues monitoring for a display device 102.

Although the system 100 has been described above in regard to the display or presentation of personalized images or video, it should be appreciated that the system 100 may be utilized to disseminate additional or other content in a private manner in other embodiments. For example, the technologies and techniques disclosed herein may be utilized to present personalized audio or other digital content using a negotiated audio protocol, similar to the video protocol described above.

EXAMPLES

Illustrative examples of the devices, systems, and methods disclosed herein are provided below. An embodiment of the devices, systems, and methods may include any one or more, and any combination of, the examples described below.

Example 1 includes a display device for displaying personalized images, the display device comprising a viewer detection module to determine whether a user viewing device is in a proximity to the display device; a display personalization module to (i) authorize the user viewing device to view a personalized image in response to a determination that the user viewing device is in the proximity and (ii) establish a display protocol with the user viewing device in response to authorization of the user viewing device, wherein the display protocol is useable by the display device to display the personalized image; and a display control module to control a display to display the personalized image to a user of the user viewing device based on the display protocol, wherein the personalized image is (i) viewable by the user viewing device and (ii) is not viewable by unauthorized viewing devices.

Example 2 includes the subject matter of Example 1, and wherein to control the display of the display device comprises to display the personalized image in an encrypted or obfuscated format on the display.

Example 3 includes the subject matter of any of Examples 1 and 2, and wherein to control the display of the display device comprises to display the personalized image and a public image on the display, the public image viewable by unauthorized viewing devices.

Example 4 includes the subject matter of any of Examples 1-3, and wherein the display protocol is (i) usable by the display device to obscure the personalized image on the display device and (ii) usable by the user viewing device to unobscured the personalized image on the user viewing device.

Example 5 includes the subject matter of any of Examples 1-4, and wherein the display protocol comprises an encryption protocol (i) usable by the display device to encrypt the personalized image on the display device and (ii) usable by the user viewing device to decrypt the personalized image on the user viewing device.

Example 6 includes the subject matter of any of Examples 1-5, and wherein the display protocol comprises at least one of a polarization display protocol, a color filtering display protocol, a view segmentation display protocol, a layered depth variation display protocol, a pixel obfuscation display protocol, or a pixel encoding display protocol.

Example 7 includes the subject matter of any of Examples 1-6, and wherein to authorize the user viewing device comprises to receive identification data from the user viewing device, the identification data identifying at least one of the user viewing device or the user of the user viewing device.

Example 8 includes the subject matter of any of Examples 1-7, and wherein to authorize the user viewing device comprises to determine the personalized image based a viewer policy associated with the user of the user viewing device.

Example 9 includes the subject matter of any of Examples 1-8, and wherein to determine the personalized image comprises to determine the personalized image based on a viewer policy that defines a characteristic of at least one of the user viewing device or the user of the user viewing device.

Example 10 includes the subject matter of any of Examples 1-9, and wherein to determine the personalized image comprises to determine the personalized image based on an analysis of an image of the user of the user viewing device.

Example 11 includes the subject matter of any of Examples 1-10, and further including a local storage, wherein the viewer policy is stored in the local storage and the display personalization module is further to retrieve the viewer policy from the local storage.

Example 12 includes the subject matter of any of Examples 1-11, and wherein the display personalization module is further to receive the viewer policy from the user viewing device.

Example 13 includes the subject matter of any of Examples 1-12, and further including a sensor to generate sensor data indicative of a characteristic of at least one of the user viewing device or the user of the user viewing device, wherein the display personalization module is to infer the viewer policy based on the sensor data.

Example 14 includes the subject matter of any of Examples 1-13, and wherein to determine whether the user viewing device is in the proximity comprises to monitor a network connection to which the display device is connected for network communication from the user viewing device.

Example 15 includes the subject matter of any of Examples 1-14, and wherein the viewer detection module is to transmit a discovery request to the user viewing device; and receive a response from the user viewing device in response to the discovery request.

Example 16 includes the subject matter of any of Examples 1-15, and wherein to determine whether the user viewing device is in the proximity comprises to receive a query communication from the user viewing device.

Example 17 includes the subject matter of any of Examples 1-16, and wherein the display personalization module is further to track a position of the user viewing device relative to the display device, and the display control module is to control the display to display the personalized image to the user of the user viewing device based on the display protocol and the position of the user viewing device relative to the display device.

Example 18 includes the subject matter of any of Examples 1-17, and wherein the display personalization module is further to detect an interaction of a user of the user viewing device with the display device or the user viewing device, and the display control module is to control the display to display the personalized image to the user of the user viewing device based on the display protocol and the detected interaction.

Example 19 includes the subject matter of any of Examples 1-18, and wherein the display personalization module is further to track a position of the user viewing device relative to the display device; and update the display protocol based on the position of the user viewing device relative to the display device.

Example 20 includes the subject matter of any of Examples 1-19, and wherein the display control module is further to generate an audio signal associated with the personalized image, wherein the audio signal is (i) playable by the user viewing device and (ii) not playable by unauthorized viewing devices.

Example 21 includes a user viewing device usable to view a personalized image generated by a display device, the user viewing device comprising a display detection module to determine whether the display device is in a proximity to the user viewing device; a viewer personalization module to (i) communicate with the display device to authorize the user viewing device to view a personalized image generated by the display device in response to a determination that the display device is in the proximity and (ii) establish, with the display device, a display protocol usable by the user viewing device to view the personalized image; and a viewer display module to facilitate the viewing of the personalized image by a user of the user viewing device based on the display protocol.

Example 22 includes the subject matter of Example 21, and wherein to facilitate the viewing of the personalized image comprises to decrypt an encrypted personalized image based on the display protocol.

Example 23 includes the subject matter of any of Examples 21 and 22, and further including a display, and wherein to facilitate the viewing of the personalized image comprises to control the display of the user viewing device to display the personalized image on the user viewing device based on the display protocol.

Example 24 includes the subject matter of any of Examples 21-23, and further including a viewing lens, and wherein to facilitate the viewing of the personalized image comprises to control the viewing lens of the user viewing device based on the display protocol to enable the user to view the personalized image displayed by the display device.

Example 25 includes the subject matter of any of Examples 21-24, and wherein to facilitate the viewing of the personalized image comprises to facilitate the viewing of the personalized image by the user of the user viewing device based on the display protocol and a location of the user viewing device relative to the display device.

Example 26 includes the subject matter of any of Examples 21-25, and wherein the viewer display module is to facilitate the viewing of the personalized image by the user of the user viewing device based on the display protocol and an interaction of the user with the user viewing device or the display device.

Example 27 includes the subject matter of any of Examples 21-26, and wherein the viewer personalization module is to receive the personalized image from the display device.

Example 28 includes the subject matter of any of Examples 21-27, and wherein the display protocol comprises a display protocol (i) usable by the display device to obscure the personalized image on the display device and (ii) usable by the user viewing device to unobscured the personalized image on the user viewing device.

Example 29 includes the subject matter of any of Examples 21-28, and wherein the display protocol comprises an encryption protocol (i) usable by the display device to encrypt the personalized image on the display device and (ii) usable by the user viewing device to decrypt the personalized image on the user viewing device.

Example 30 includes the subject matter of any of Examples 21-29, and wherein the display protocol comprises at least one of a polarization display protocol, a color filtering display protocol, a view segmentation display protocol, a layered depth variation display protocol, a pixel obfuscation display protocol, or a pixel encoding display protocol.

Example 31 includes the subject matter of any of Examples 21-30, and further including a viewing lens, wherein the viewing lens comprises an adjustment mechanism to adjust a visual characteristic of the lens, and wherein the display protocol comprises a control protocol to control the adjustment mechanism of the viewing lens.

Example 32 includes the subject matter of any of Examples 21-31, and wherein to communicate with the display device to authorize the user viewing device comprises to transmit, to the display device, identification data that identifies least one of the user viewing device or the user of the user viewing device.

Example 33 includes the subject matter of any of Examples 21-32, and wherein to communicate with the display device to authorize the user viewing device comprises to transmit, to the display device, a user viewing policy associated with the user of the user viewing device.

Example 34 includes the subject matter of any of Examples 21-33, and wherein the viewer policy defines a characteristic of at least one of the user viewing device or the user of the user viewing device.

Example 35 includes the subject matter of any of Examples 21-34, and wherein to determine whether the display device is in a proximity comprises to monitor a network connection to which the user viewing device is connected for network communication from the display device.

Example 36 includes the subject matter of any of Examples 21-35, and wherein to determine whether the display device is in a proximity comprises to receive a discovery request transmitted by the display device; and transmit a response to the display device in response to the discovery request.

Example 37 includes the subject matter of any of Examples 21-36, and wherein to determine whether the display device is in a proximity comprises to transmit a query communication to the display device.

Example 38 includes a method for displaying personalized images on a display device, the method comprising determining, by the display device, whether a user viewing device in a proximity to the display device; authorizing, by the display device, the user viewing device to view a personalized image in response to a determination that the user viewing device is in the proximity; establishing, by the display device and with the user viewing device, a display protocol useable to display the personalized image in response to authorizing the user viewing device; and controlling a display to display the personalized image to a user of the user viewing device based on the display protocol such that the personalized image is (i) viewable by the user viewing device and (ii) is not viewable by unauthorized viewing devices.

Example 39 includes the subject matter of Example 38, and wherein controlling the display of the display device comprises displaying the personalized image in an encrypted or obfuscated format on the display.

Example 40 includes the subject matter of any of Examples 38 and 39, and wherein controlling the display of the display device comprises displaying the personalized image on the display while displaying a public image on the display, the public image viewable by unauthorized viewing devices.

Example 41 includes the subject matter of any of Examples 38-40, and wherein establishing the display protocol comprises establishing a display protocol (i) usable by the display device to obscure the personalized image on the display device and (ii) usable by the user viewing device to unobscured the personalized image on the user viewing device.

Example 42 includes the subject matter of any of Examples 38-41, and wherein establishing the display protocol comprises establishing an encryption protocol (i) usable by the display device to encrypt the personalized image on the display device and (ii) usable by the user viewing device to decrypt the personalized image on the user viewing device.

Example 43 includes the subject matter of any of Examples 38-42, and wherein establishing the display protocol comprises establishing at least one of a polarization display protocol, a color filtering display protocol, a view segmentation display protocol, a layered depth variation display protocol, a pixel obfuscation display protocol, or a pixel encoding display protocol.

Example 44 includes the subject matter of any of Examples 38-43, and wherein authorizing the user viewing device comprises receiving identification data from the user viewing device, the identification data identifying at least one of the user viewing device or the user of the user viewing device.

Example 45 includes the subject matter of any of Examples 38-44, and wherein authorizing the user viewing device comprises determining the personalized image based a viewer policy associated with the user of the user viewing device.

Example 46 includes the subject matter of any of Examples 38-45, and wherein determining the personalized image comprises determining the personalized image based on a viewer policy that defines a characteristic of at least one of the user viewing device or the user of the user viewing device.

Example 47 includes the subject matter of any of Examples 38-46, and determining the personalized image comprises determining the personalized image based on an analysis of an image of the user of the user viewing device.

Example 48 includes the subject matter of any of Examples 38-47, and further including retrieving the viewer policy from a local storage.

Example 49 includes the subject matter of any of Examples 38-48, and further including receiving the viewer policy from the user viewing device.

Example 50 includes the subject matter of any of Examples 38-49, and further including generating, by a sensor of the display device, sensor data indicative of a characteristic of at least one of the user viewing device or the user of the user viewing device; and inferring the viewer policy based on the sensor data.

Example 51 includes the subject matter of any of Examples 38-50, and wherein detecting the user viewing device comprises monitoring a network connection to which the display device is connected for network communication from the user viewing device.

Example 52 includes the subject matter of any of Examples 38-51, and wherein detecting the user viewing device comprises transmitting, by the display device, a discovery request to the user viewing device; and receiving, by the display device, a response from the user viewing device in response to the discovery request.

Example 53 includes the subject matter of any of Examples 38-52, and wherein detecting the user viewing device comprises receiving a query communication from the user viewing device.

Example 54 includes the subject matter of any of Examples 38-53, and further including tracking a position of the user viewing device relative to the display device; and wherein controlling the display of the display device comprises controlling the display of the display device to display the personalized image to the user of the user viewing device based on the display protocol and the position of the user viewing device relative to the display device.

Example 55 includes the subject matter of any of Examples 38-54, and further including detecting an interaction of a user of the user viewing device with the display device or the user viewing device, and wherein controlling the display of the display device comprises controlling the display of the display device to display the personalized image to the user of the user viewing device based on the display protocol and the detected interaction.

Example 56 includes the subject matter of any of Examples 38-55, and further including tracking a position of the user viewing device relative to the display device; and updating the display protocol based on the position of the user viewing device relative to the display device.

Example 57 includes the subject matter of any of Examples 38-56, and, further including generating an audio signal associated with the personalized image, wherein the audio signal is (i) playable by the user viewing device and (ii) not playable by unauthorized viewing devices.

Example 58 includes a display device for displaying personalized images, the display device comprising a display; a processor; and a memory having stored therein a plurality of instructions that when executed by the processor cause the display device to perform the method of any of Examples 34-51.

Example 59 includes one or more machine readable storage media comprising a plurality of instructions stored thereon that in response to being executed result in a display device performing the method of any of Examples 34-51.

Example 60 includes a method for viewing a personalized image generated by a display device, the method comprising determining, by a user viewing device, whether a display device is in a proximity to the user viewing device; communicating, by the user viewing device, with the display device to authorize the user viewing device to view a personalized image generated by the display device in response to a determination that the display device is in the proximity; establishing, by the user viewing device and with the display device, a display protocol usable by the user viewing device to view the personalized image; and facilitating, by the user viewing device, the viewing of the personalized image by a user of the user viewing device based on the display protocol.

Example 61 includes the subject matter of Example 60, and wherein facilitating the viewing of the personalized image comprises decrypting an encrypted personalized image based on the display protocol.

Example 62 includes the subject matter of any of Examples 60 and 61, and wherein facilitating the viewing of the personalized image comprises controlling a display of the user viewing device to display the personalized image on the user viewing device based on the display protocol.

Example 63 includes the subject matter of any of Examples 60-62, and wherein facilitating the viewing of the personalized image comprises controlling a viewing lens of the user viewing device based on the display protocol to enable the user to view the personalized image displayed by the display device.

Example 64 includes the subject matter of any of Examples 60-63, and wherein facilitating the viewing of the personalized image comprises receiving, by the user viewing device, the personalized image from the display device.

Example 65 includes the subject matter of any of Examples 60-64, and wherein facilitating the viewing of the personalized image comprises facilitating, by the user viewing device, the viewing of the personalized image by the user of the user viewing device based on the display protocol and a location of the user viewing device relative to the display device.

Example 66 includes the subject matter of any of Examples 60-65, and wherein facilitating the viewing of the personalized image comprises facilitating, by the user viewing device, the viewing of the personalized image by the user of the user viewing device based on the display protocol and an interaction of the user with the user viewing device or the display device.

Example 67 includes the subject matter of any of Examples 60-66, and wherein establishing the display protocol comprises a display protocol (i) usable by the display device to obscure the personalized image on the display device and (ii) usable by the user viewing device to unobscured the personalized image on the user viewing device.

Example 68 includes the subject matter of any of Examples 60-67, and wherein establishing the display protocol comprises establishing an encryption protocol (i) usable by the display device to encrypt the personalized image on the display device and (ii) usable by the user viewing device to decrypt the personalized image on the user viewing device.

Example 69 includes the subject matter of any of Examples 60-68, and wherein establishing the display protocol comprises establishing at least one of a polarization display protocol, a color filtering display protocol, a view segmentation display protocol, a layered depth variation display protocol, a pixel obfuscation display protocol, or a pixel encoding display protocol.

Example 70 includes the subject matter of any of Examples 60-69, and wherein communicating with the display device to authorize the user viewing device comprises transmitting, by the user viewing device and to the display device, identification data that identifies least one of the user viewing device or the user of the user viewing device.

Example 71 includes the subject matter of any of Examples 60-70, and wherein communicating with the display device to authorize the user viewing device comprises transmitting, by the user viewing device and to the display device, a user viewing policy associated with the user of the user viewing device.

Example 72 includes the subject matter of any of Examples 60-71, and wherein the viewer policy defines a characteristic of at least one of the user viewing device or the user of the user viewing device.

Example 73 includes the subject matter of any of Examples 60-72, and wherein detecting the display device comprises monitoring a network connection to which the user viewing device is connected for network communication from the display device.

Example 74 includes the subject matter of any of Examples 60-73, and wherein detecting the display device comprises receiving, by user viewing device, a discovery request transmitted by the display device; and transmitting, by the user viewing device, a response to the display device in response to the discovery request.

Example 75 includes the subject matter of any of Examples 60-74, and wherein detecting the display device comprises transmitting a query communication to the display device.

Example 76 includes a user viewing device usable to view a personalized image generated by a display device, the user viewing device comprising a processor; and a memory having stored therein a plurality of instructions that when executed by the processor cause the user viewing device to perform the method of any of Examples 54-68.

Example 77 includes one or more machine readable storage media comprising a plurality of instructions stored thereon that in response to being executed result in a user viewing device performing the method of any of Examples 54-68.

The invention claimed is:

1. An apparatus comprising:
processing circuitry coupled to a memory, the processing circuitry to:
monitor for display devices and user viewing devices within a vicinity;
establish display protocol between a user viewing device and a display device if the user viewing device and the display device are found in the vicinity and within a proximity of each other, wherein the user viewing device includes an authorized user viewing device; and
facilitate viewing of one or more personalized images using the user viewing device, wherein the one or more personalized images at displayed using the display device or one or more local display devices associated with the user viewing device, wherein the display protocol is modifiable with changes to locations of a user having access to the user viewing device, wherein the display protocol to define levels of accessibility associated with the one or more personalized images.

2. The apparatus of claim 1, wherein the one or more personalized images are displayed based on the display protocol such that the one or more personalized images are not accessible to one or more unauthorized user viewing devices.

3. The apparatus of claim 1, wherein the processing circuitry is further to locate the user viewing device and authenticate the user viewing device prior to establishing the display protocol between the user viewing device and the display device, wherein the one or more personalized images are displayed controlled through encryption or obfuscation.

4. The apparatus of claim 1, wherein the processing circuitry is further to exchange identifying data between the user viewing device and the display device based on query requests or discovery requests, and wherein the user viewing device and the display device are placed in communication with each other via a communication network.

5. The apparatus of claim 1, wherein the processing circuitry is further to facilitate viewing of one or more public images using the user viewing device, wherein the one or more public images are viewable by one or more unauthorized user viewing devices, wherein the processing circuitry comprises one or more of application processing circuitry or graphics processing circuitry.

6. The apparatus of claim 1, wherein the processing circuitry is further to:
track a position of the user viewing device relative to the display device; and
update the display protocol based on the position of the user viewing device relative to the display device, wherein the user viewing device comprises a mobile computing device.

7. A method comprising:
monitoring, by a computing device, for display devices and user viewing devices within a vicinity;
establishing display protocol between a user viewing device and a display device if the user viewing device and the display device are found in the vicinity and within a proximity of each other, wherein the user viewing device includes an authorized user viewing device; and
facilitating viewing of one or more personalized images using the user viewing device, wherein the one or more personalized images are displayed using the display device or one or more local display devices associated with the user viewing device, wherein the display protocol is modifiable with changes to locations of a user having access to the user viewing device, wherein the display protocol to define levels of accessibility associated with the one or more personalized images.

8. The method of claim 7, wherein the one or more personalized images are displayed based on the display protocol such that the one or more personalized images are not accessible to one or more unauthorized user viewing devices.

9. The method of claim 7, further comprising locating the user viewing device and authenticating the user viewing device prior to establishing the display protocol between the user viewing device and the display device, wherein the one or more personalized images are displayed controlled through encryption or obfuscation.

10. The method of claim 7, further comprising exchanging identifying data between the user viewing device and the display device based on query requests or discovery requests, and wherein the user viewing device and the display device are placed in communication with each other via a communication network.

11. The method of claim 7, further comprising facilitating viewing of one or more public images using the user viewing device, wherein the one or more public images are viewable by one or more unauthorized user viewing devices, wherein the computing device comprises processing circuitry coupled to a memory, the processing circuitry having one or more of application processing circuitry or graphics processing circuitry.

12. The method of claim 7, further comprising:
tracking a position of the user viewing device relative to the display device; and
updating the display protocol based on the position of the user viewing device relative to the display device, wherein the user viewing device comprises a mobile computing device.

13. At least one non-transitory computer-readable medium having stored thereon instructions which, when executed, cause a computing device to perform operations comprising:
monitoring for display devices and user viewing devices within a vicinity;
establishing display protocol between a user viewing device and a display device if the user viewing device and the display device are found in the vicinity and within a proximity of each other, wherein the user viewing device includes an authorized user viewing device; and
facilitating viewing of one or more personalized images using the user viewing device, wherein the one or more personalized images are displayed using the display device or one or more local display devices associated with the user viewing device, wherein the display protocol is modifiable with changes to locations of a user having access to the user viewing device, wherein the display protocol to define levels of accessibility associated with the one or more personalized images.

14. The non-transitory computer-readable medium of claim 13, wherein the one or more personalized images are displayed based on the display protocol such that the one or more personalized images are not accessible to one or more unauthorized user viewing devices.

15. The non-transitory computer-readable medium of claim 13, wherein the operations further comprise locating the user viewing device and authenticating the user viewing device prior to establishing the display protocol between the user viewing device and the display device, wherein the one or more personalized images are displayed controlled through encryption or obfuscation.

16. The non-transitory computer-readable medium of claim 13, wherein the operations further comprise exchanging identifying data between the user viewing device and the display device based on query requests or discovery requests, and wherein the user viewing device and the display device are placed in communication with each other via a communication network.

17. The non-transitory computer-readable medium of claim 13, wherein the operations further comprise facilitating viewing of one or more public images using the user viewing device, wherein the one or more public images are viewable by one or more unauthorized user viewing devices, wherein the computing device comprises processing circuitry coupled to a memory, the processing circuitry having one or more of application processing circuitry or graphics processing circuitry.

18. The non-transitory computer-readable medium of claim 13, wherein the operations further comprise:
tracking a position of the user viewing device relative to the display device; and
updating the display protocol based on the position of the user viewing device relative to the display device, wherein the user viewing device comprises a mobile computing device.

* * * * *